S. SEKINE.
SIPHON.
APPLICATION FILED AUG. 22, 1910.
991,657.
Patented May 9, 1911.
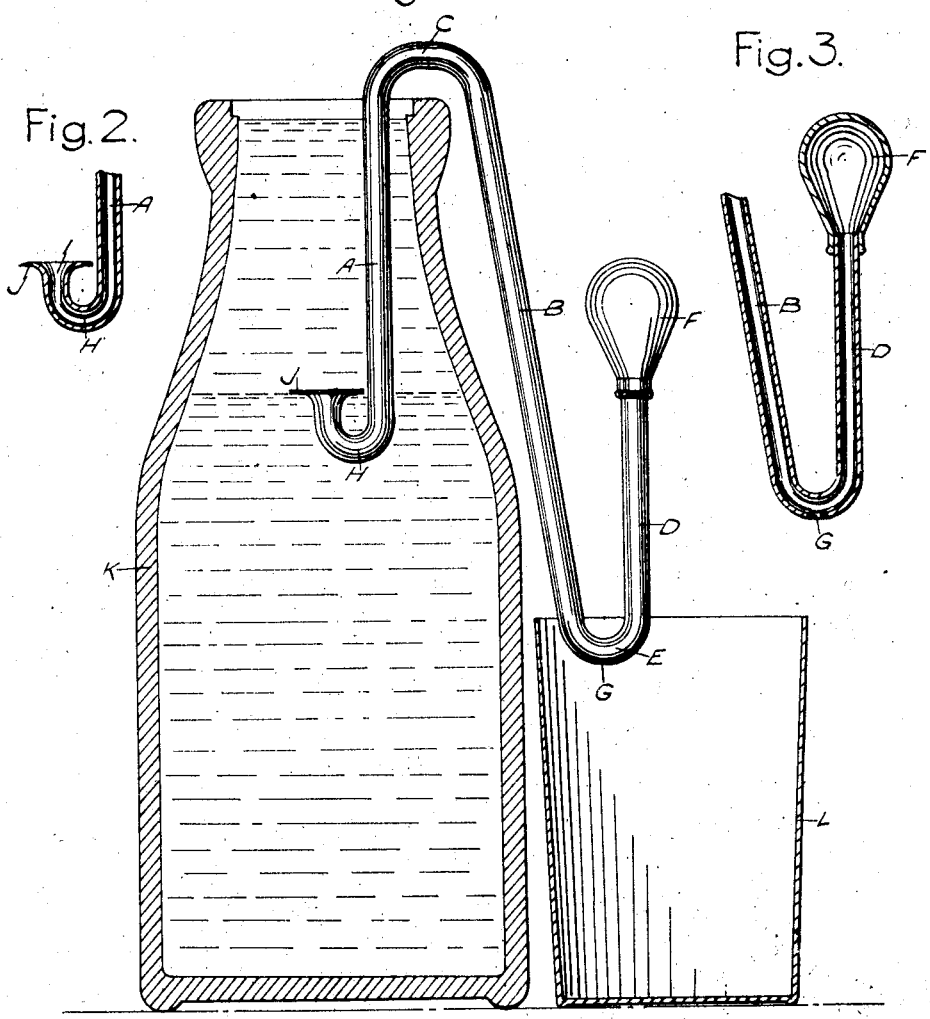

UNITED STATES PATENT OFFICE.

SENTARO SEKINE, OF CHICAGO, ILLINOIS.

SIPHON.

991,657.

Specification of Letters Patent.    Patented May 9, 1911.

Application filed August 22, 1910.   Serial No. 578,450.

*To all whom it may concern:*

Be it known that I, SENTARO SEKINE, a subject of the Emperor of Japan, residing at Chicago, in the county of Cook and State of Illinois, have invented certain new and useful Improvements in Siphons, of which the following is a specification.

My invention relates to a siphon, and particularly to a siphon intended for making a separation between liquids having different specific gravities, which is suitable, for example, for removing the cream, after it has risen, from the top of milk bottles; although it will be understood that the invention is not limited to this particular use. When a siphon is to be so employed, it is necessary, for sanitary reasons, that all the portions of the device with which the liquid comes into contact should be made of material, such as glass, which will not be chemically affected by the cream, and which will not rust when washed, and the same is true if the device is to be used in the laboratory for the separation of chemicals; and it is also very desirable that the fluid conduit should be free from sharp corners or edges or recesses, which make the device difficult to keep clean. Again, it is desirable that the intake end of the device be constructed so as to prevent or hinder any upward flow in the heavier liquid, when the lighter liquid is being decanted, and that the device used for initially rarefying the air, so as to start the flow, should be so constructed that the decanting liquid cannot be drawn up into it.

The object of my invention is to provide a siphon combining all of these several advantageous features, and, in addition, the advantages of simplicity and cheapness of construction.

The invention, in a preferred embodiment, is shown in the accompanying drawing, wherein—

Figure 1 is a view showing the siphon in elevation, the vessels in connection with which the same is shown being in section. Fig. 2 a fragmentary section of the intake end of the device; and Fig. 3 a similar view of the discharge end.

Like characters of reference indicate like parts in the several figures of the drawing.

The device, in the preferred construction shown, consists of a glass tube which is bent so as to provide the intake arm A, the discharge arm B, the substantially U-shaped bend C, connecting A and B, the suction arm D, and the U-shaped bend E making the portion D continuous with the portion B. The end of the suction arm D is provided with the compressible, preferably rubber, bulb F. The bend E on its lower side is formed with a discharge opening G. Preferably the intake arm is formed at its intake end with the U-shaped bend H, the opening I being flaring and provided with the rim J.

The device so constructed is used, for example, for decanting the cream from a milk bottle, in the following manner: The intake end of the siphon is inserted into the mouth of the bottle K until the rim J is at, say the milk level, indicated by the dotted line in Fig. 1; or, of course, it need not be put into the bottle so deeply. The bulb F is compressed. A vessel L is placed under the discharge opening G. The user then places his finger over the opening G, so as to cover the same, and releases the bulb. The rarefication of the air in the tube starts the flow of the cream through the siphon and out of opening G, which, of course, has been uncovered as soon as the bulb F is allowed to expand. It will be seen that the flow from the bottle is downward into the intake end of the siphon, so that there is little tendency to disturb the milk. The rim J also tends to prevent any flow of the milk into the mouth of the siphon and furthermore aids the eye in accurately locating the mouth at the desired level.

The device can be made entirely of glass and can be made, as shown, so that there are no sharp corners, projecting edges or pockets, which would make the device difficult to keep clean. By properly proportioning the size of the bulb F in relation to the volumetric contents of the tube and the length of the intake, discharge and suction arms, it will be possible to obtain suction enough to always start the flow, while making it impossible that any of the decanted liquid should be drawn up through the suction arm into the bulb. Thus the volume of the tube from the bend C to the bulb F should be at least as great as that of the bulb F.

The device may be made very cheaply, as it may consist simply of a glass tube and a rubber bulb. The tube may be washed by removing the bulb and running water through it.

I claim:

1. A device of the character described, consisting of a glass tube formed so as to provide an intake arm terminating in an upward bend which is provided with a horizontally projecting rim, a discharge arm, a suction arm, and a bend making the lower end of the discharge arm continuous with the suction arm and which is formed on its under side with a discharge opening; in combination with a compressible bulb on the end of said suction arm.

2. A device of the character described, consisting of a glass tube formed so as to provide an intake arm terminating in a U-shaped bend, the mouth of which is flaring and provided with a horizontally projecting rim, a discharge arm, a substantially U-shaped bend between the intake arm and the discharge arm, a suction arm, and a substantially U-shaped bend between the discharge arm and the suction arm, said last-mentioned bend being formed on its under side with a discharge opening; in combination with a compressible bulb on the end of said suction arm.

SENTARO SEKINE.

Witnesses:
P. H. TRUMAN,
H. L. PECK.